US012241296B2

(12) United States Patent
Cullerton et al.

(10) Patent No.: US 12,241,296 B2

(45) Date of Patent: Mar. 4, 2025

(54) SLIDING DOOR SYSTEM

(71) Applicants: Matt Cullerton, Tuncurry (AU); Tim Charles, Tuncurry (AU)

(72) Inventors: Matt Cullerton, Tuncurry (AU); Tim Charles, Tuncurry (AU)

( * ) Notice: Subject to any disclaimer, the term of this patent is extended or adjusted under 35 U.S.C. 154(b) by 0 days.

(21) Appl. No.: 18/712,645

(22) PCT Filed: Dec. 7, 2022

(86) PCT No.: PCT/AU2022/051461

§ 371 (c)(1),
(2) Date: May 22, 2024

(87) PCT Pub. No.: WO2023/102603

PCT Pub. Date: Jun. 15, 2023

(65) Prior Publication Data

US 2025/0012125 A1 Jan. 9, 2025

(30) Foreign Application Priority Data

Dec. 7, 2021 (AU) ................................ 2021903949

(51) Int. Cl.
*E05D 15/06* (2006.01)
*E05F 15/60* (2015.01)

(52) U.S. Cl.
CPC ....... *E05D 15/063* (2013.01); *E05D 15/0626* (2013.01); *E05D 15/0639* (2013.01);
(Continued)

(58) Field of Classification Search
CPC .... E05F 15/60; E05D 15/063; E05D 15/0626; E05D 15/0621; E05D 15/0652;
(Continued)

(56) References Cited

U.S. PATENT DOCUMENTS 3,346,993 A * 10/1967 Johnson ................ E05D 15/066 49/419
3,442,051 A * 5/1969 Johnson ................ F16C 39/063 49/423

(Continued)

FOREIGN PATENT DOCUMENTS

CN 209724047 U 12/2019
DE 20121499 U1 12/2002

(Continued)

OTHER PUBLICATIONS

International Search Report & Written Opinion dated Feb. 22, 2023 from PCT Application No. PCT/ AU2022/051461 (8 pages).

(Continued)

*Primary Examiner* — Justin B Rephann

(74) *Attorney, Agent, or Firm* — INNOVATION CAPITAL LAW GROUP, LLP; Vic Lin

(57) ABSTRACT

The present sliding door system is designed to reduce opening and closing sliding resistance using magnetic force applied in opposition to the weight of the door. The present system has a particular configuration which is designed to achieve significant magnetic force attraction to overcome the weight of the door despite having compact configuration and which has a mechanism in the form of the horizontal rollers designed to overcome unwanted lateral magnetic force caused by the maximisation of the width of the permanent magnets within the confines of the channel.

20 Claims, 4 Drawing Sheets

(52) U.S. Cl.
CPC ...... *E05F 15/60* (2015.01); *E05D 2015/0695* (2013.01); *E05Y 2201/46* (2013.01); *E05Y 2201/64* (2013.01)

(58) Field of Classification Search
CPC ................ E05D 15/06; E05D 15/0634; E05D 2015/0695; E05Y 2900/132; E05Y 2201/46; E05Y 2201/64
See application file for complete search history.

(56) References Cited

U.S. PATENT DOCUMENTS

| | | | | | |
|---|---|---|---|---|---|
| 5,134,324 | A * | 7/1992 | Sakagami | H02K 41/031 310/12.32 |
| 7,592,720 | B2 * | 9/2009 | Busch | H02K 41/031 310/12.04 |
| 7,752,810 | B2 | 7/2010 | Haab et al. | |
| 8,857,015 | B2 * | 10/2014 | Hufen | E05D 15/0652 49/358 |
| 10,113,348 | B2 * | 10/2018 | Lam | A47K 3/34 |
| 11,021,900 | B2 * | 6/2021 | Lam | E05D 15/0652 |
| 2005/0172563 | A1 * | 8/2005 | Komoda | A47H 5/0325 49/358 |
| 2008/0100152 | A1 * | 5/2008 | Busch | E05F 15/60 310/12.25 |
| 2008/0209813 | A1 * | 9/2008 | Haab | E05D 15/0621 49/360 |
| 2015/0211276 | A1 | 7/2015 | Gabriel et al. | |
| 2019/0031211 | A1 * | 1/2019 | Cartier | B61D 19/02 |
| 2019/0242168 | A1 * | 8/2019 | Brun | E05D 15/0621 |
| 2021/0332626 | A1 * | 10/2021 | Girotto | E05D 15/063 |
| 2022/0381075 | A1 * | 12/2022 | Girotto | E05F 15/632 |

FOREIGN PATENT DOCUMENTS

| | | | |
|---|---|---|---|
| JP | H03217572 | A | 9/1991 |
| JP | H0569278 | U | 9/1993 |
| WO | 2011016114 | A1 | 2/2011 |
| WO | 2017132762 | A1 | 8/2017 |

OTHER PUBLICATIONS

International-type search report dated Oct. 13, 2022 from AU Application No. 2021903949 (11 pages).

* cited by examiner

SLIDING DOOR SYSTEM

FIELD OF THE INVENTION

This invention relates generally to a type of sliding door system designed to reduce opening and closing sliding resistance using magnetic force applied in opposition to the weight of the door.

BACKGROUND OF THE INVENTION

A sliding door typically comprises a header rail having a roller carriage running therealong to slidably suspend a door panel between open and closed positions.

The weight of the door bears on the rollers however and thereby increases sliding resistance to opening and closing of the door which is generally proportional to the weight of the door. As such, particularly heavy door panels are difficult to slide open and closed.

Various arrangements have been devised to reduce the effective weight of the door using magnetic attractive force which acts oppositely against gravitational force of the door panel.

For example, U.S. Pat. No. 7,752,810B2 (2008-09-04) Haab et al. discloses an arrangement which has a carriage having hard magnets which act in opposition to rail magnets. WO2011016114A1 (2011-02-1) Haruo et al. discloses a sliding door system having a panel suspended between upper and vertical rollers and wherein upper and lower edges thereof are respectively attracted and repelled by installed magnetic tracks. US20150211276 Å1 (2015-07-30) Gabriel et al. discloses an easily displaceable sliding door which has a carriage being entirely concealed within a channel to be hidden from external view. JPH03217572A (1991-09-2) Tabuchi et al. discloses a similar arrangement having a magnetic carriage running within a channel.

Some arrangements such as WO2017132762A1 (2017-08-10) Cartier at el. use electromagnets to actively slide the door panel.

The present invention seeks to provide a sliding door system which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a sliding door system which is designed to reduce opening and closing resistance by suspending a sliding door with magnetic force in excess of the weight of the door which effectively ‘floats’ the sliding door to eliminate downward vertical force applied to the rollers, thereby significantly reducing opening and closing resistive force The present arrangement is designed not only to be simple, inexpensive and robust but able to achieve significant magnetic force attraction within a relatively compact header channel configuration.

Specifically, the present system comprises a ferromagnetic header channel comprising a top portion, side portions and bottom rails.

The system further comprises a suspension carriage running within the channel

The carriage has a chassis and pairs of vertical rollers held axially adjacent along the length of the chassis and engaged oppositely between the top portion and the bottom rails.

The chassis further supports pairs of horizontal rollers held axially adjacent along the length of the chassis and engaged between the side portions of the channel.

The chassis further holds permanent magnets along the top of the chassis which are magnetically attracted to the top portion of the header channel. These permanent magnets define an upper surface held closely adjacent the top portion by the carriage to define a small air gap between the permanent magnets and the top portion.

The present system maximises the effective width of the magnets within the confines of the present relatively narrow channel. Specifically, the channel defines an interior width between the side portions and the permanent magnets have a width at least 80% of the interior width of the channel. Furthermore, the permanent magnets and the pairs of vertical rollers are axially offset along the length of the chassis and wherein sides of the magnets overlap the vertical rollers laterally. The sides of the permanent magnets may extend beyond not only inner sides of the vertical rollers but also outer sides thereof.

The system further comprises a door hanger suspended by the chassis between the bottom rails and a sliding door suspended from the door hanger beneath the header channel.

Magnetic force attraction between the permanent magnets and the top portion exceeds the weight of the door and the carriage so that the vertical rollers predominantly run along the upper portion of the channel.

The present configuration can be inexpensively constructed wherein only the carriage requires permanent magnets thereby simplifying the design and construction of the header channel which may be entirely metallic and without permanent magnets installed therealong.

Furthermore, the laterally overlapping configuration of the permanent magnets and vertical rollers allows the system to have a configuration which is able to achieve significant magnetic force to overcome the weight of even heavy sliding doors despite having a relatively narrow header channel.

Unwanted lateral magnetic attraction caused by the close proximity of the sides of the permanent magnets and the side portions of the channel are overcome by the placement of the horizontal rollers.

As such, the present system has a particular configuration which is designed to achieve significant magnetic force attraction to overcome the weight of the door despite having compact configuration and which has a mechanism in the form of the horizontal rollers designed to overcome unwanted lateral magnetic force caused by the maximisation of the width of the permanent magnets within the confines of the channel.

The channel may have a profile which narrows downwardly so that a relatively wider upper portion can maximise the width of the magnets and therefore magnetic attraction whereas lower inner corners laterally guide the vertical rollers. The horizontal rollers may locate within the relatively wider upper portion.

In a preferred embodiment, the present system is designed to not only overcome downward vertical force applied by the bottom rails against the vertical rollers but also to limit upward vertical force applied by the upper portion of the channel against the vertical rollers.

Preferably, the system is designed so that vertical force is limited to between 100% and 120% of the weight of the door, preferably between 100% and 110%. This limiting of the vertical force applied minimises opening and closing resistance induced by such vertical force applied by the upper portion of the channel against the vertical rollers.

The magnetic force attraction of the system may be configured by adjusting the number of permanent magnets, the sizing of the permanent magnets and the depth of the airgap. In one example, where the interior width of the channel is 63 mm and the permanent magnets are disc shaped, a 100 kg door could be suspended by the present system having one carriage having three permanent magnets and an airgap of 3 mm, thereby inducing an attractive magnetic force of 120 kg wherein each vertical roller bears a vertical force of 5 kg against the top portion. In another example, a 150 kg door could be suspended from a pair of carriages, each having eight permanent magnets and a 4 mm airgap, thereby inducing an attractive magnetic force of 160 kg wherein each vertical roller therefore bears a vertical force of 7.5 kg against the top portion. In a further example, a 200 kg door could be suspended from a pair of carriages, each having eight permanent magnets and 3 mm airgap, thereby inducing an attractive magnetic force of 240 kg wherein each vertical roller therefore bears a vertical force of 5 kg against the top portion.

In embodiments, the air gap and therefore magnetic attraction may be dynamically adjusted whilst the sliding door is attached to allow for fine adjustment within this desirous ratio. In a preferred embodiment, the system comprises a vertical offset adjustment mechanism which is configured to adjust the vertical offset of the permanent magnets with respect to the channel and thereby control the effect of depth of the airgap and wherein the vertical offset adjustment mechanism is accessible from an exterior of the channel.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
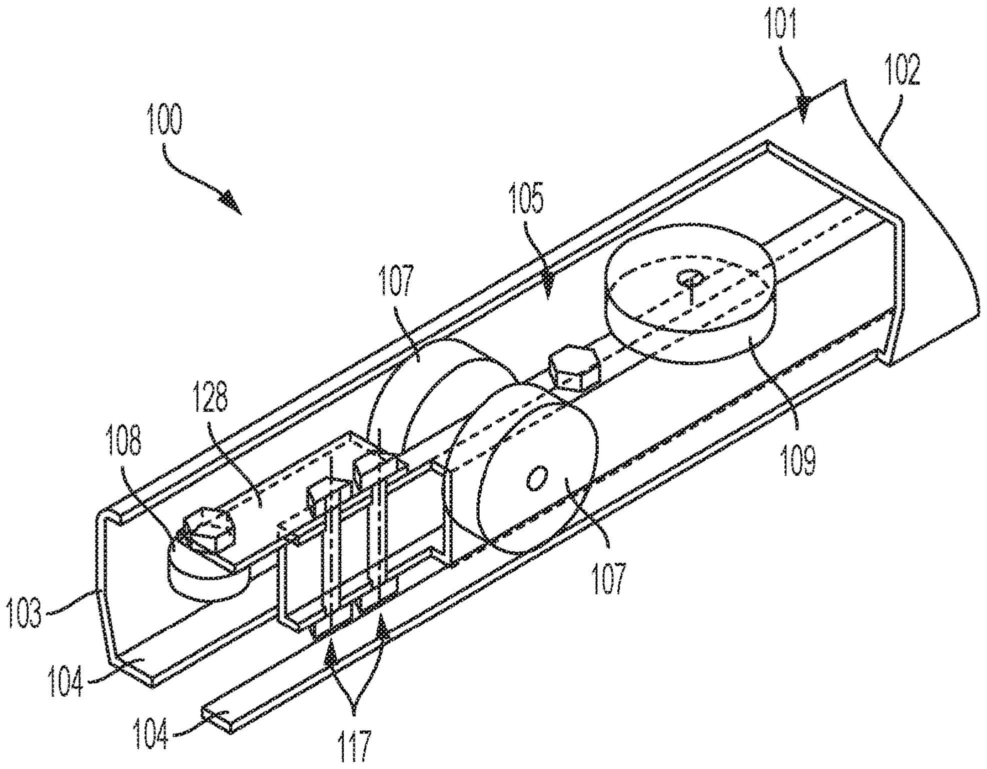
FIG. 1 shows a perspective view of a sliding door system in accordance with an embodiment.

FIG. 1 shows a sliding door system 100 which is designed to use magnetic force in excess of the weight of a sliding door to "float" the sliding door to substantially reduce opening and closing rolling resistance.

The system 100 comprises a header channel 101. The header channel 101 is ferromagnetic to magnetically attract permanent magnets. The header channel 101 may be made from an extrusion process.

Figure 3:
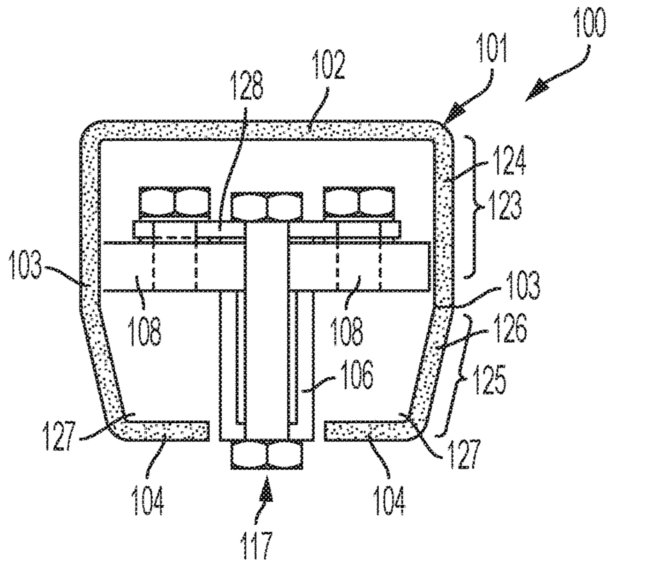
FIG. 3 shows an end cross-sectional view illustrating horizontal rollers of the system.
Figure 4:
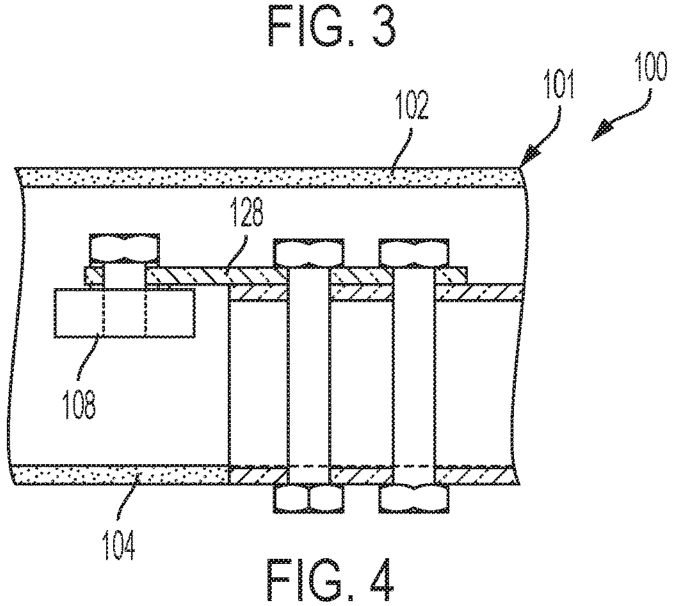
FIG. 4 shows a side interior view illustrating the horizontal rollers.

With reference to FIG. 3, the header channel 101 comprises a top portion 102, side portions 103 and bottom rails 104. The bottom rails 104 define an axial opening therebetween along the length of the channel 101.

The system 100 comprises a suspension carriage 105 running within the channel 101 along the length of the channel 101.

Figure 2:
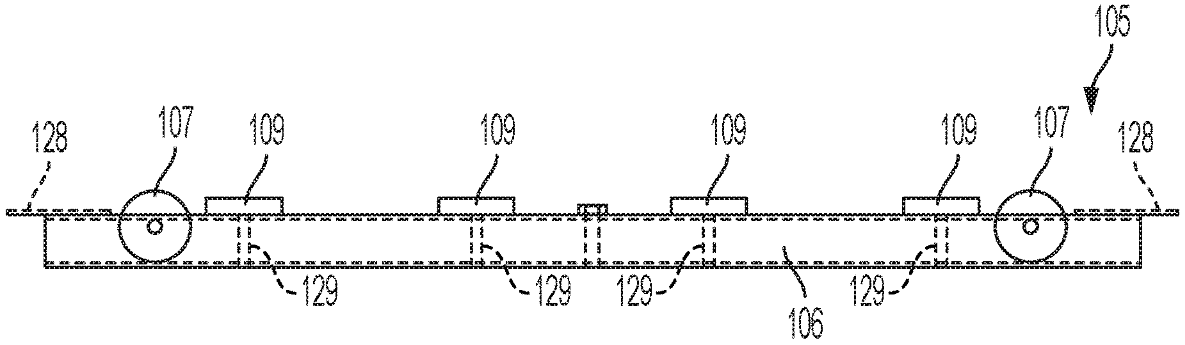
FIG. 2 shows a side view of a carriage of the system.

The carriage 105 has a chassis 106 which holds axially adjacent pairs of vertical rollers 107 along the length of the chassis 106. FIG. 2 shows the chassis 106 supporting two pairs of axially adjacent vertical rollers 107 at opposite ends of the chassis 106.

The chassis 106 is elongate and substantially rigid. The chassis 106 may be metallic or even plastic in embodiments.

Figure 6:
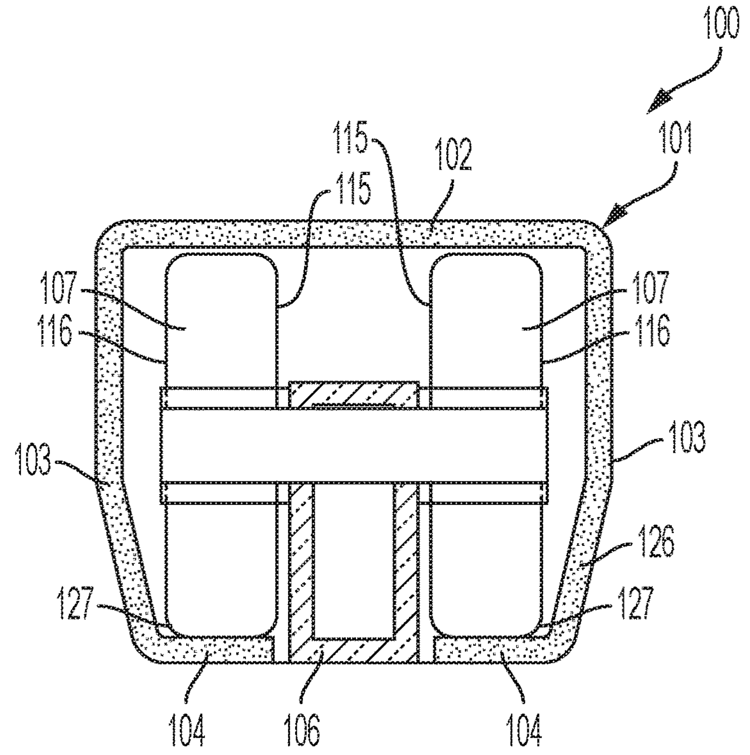
FIG. 6 shows an end cross-sectional view illustrating vertical rollers of the system
Figure 7:
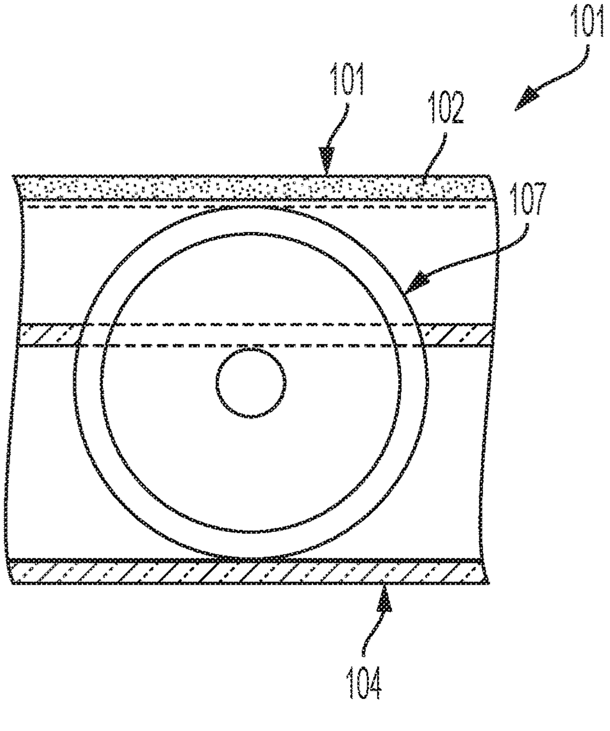
FIG. 7 shows a side interior view illustrating the vertical rollers.

FIG. 6 shows a cross section of the system 100 illustrating how the vertical rollers 107 are engaged oppositely between the top portion 102 and the bottom rails 104. Each vertical roller 107 engages a respective bottom rail 104 and the vertical rollers 107 commonly engage the top portion 102.

As alluded to above, the system 100 is designed to suspend a sliding door with sufficient magnetic force to overcome the weight thereof. As such, the rollers 107 may predominantly roll across the upper portion 102.

There is preferably little tolerance for the vertical rollers 107 between the top portion 102 and the rails 104. In a preferred embodiment, there is less than 3 mm of tolerance between the vertical rollers 107 and the top portion 102 and the rails 104. In one embodiment, the vertical rollers 107 may have a height of 52 mm whereas the height defined between the bottom rails 104 and the top portion 102 is 53 mm, thereby allowing a tolerance of 1 mm.

This small tolerance reduces or eliminates vertical jarring which may be caused by the rollers 107 transitioning between the top portion 102 and the bottom rails 104, especially when lateral force is applied to an edge of the sliding door in use when opening and closing the sliding door.

Figure 5:
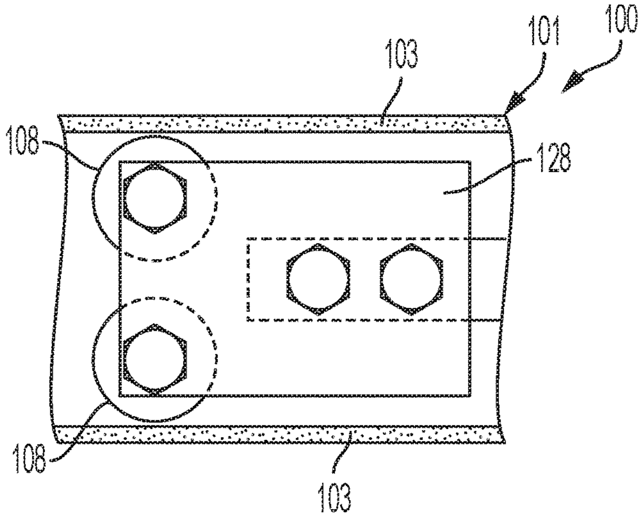
FIG. 5 shows a top interior view illustrating the horizontal rollers.

The carriage 106 further holds pairs of axially adjacent horizontal rollers 108 along the length of the chassis 106. As shown in FIG. 5, the pairs of axially adjacent horizontal rollers 108 engage the side portions 103 of the channel 101. There is similarly preferably little tolerance between the horizontal rollers 108 and the side portions 103, preferably less than 3 mm or even approximately 1 mm or less. As will become apparent from the ensuing description, the horizontal rollers 108 bear against unwanted lateral magnetic attraction of the carriage 105 within the channel 105.

Figure 9:
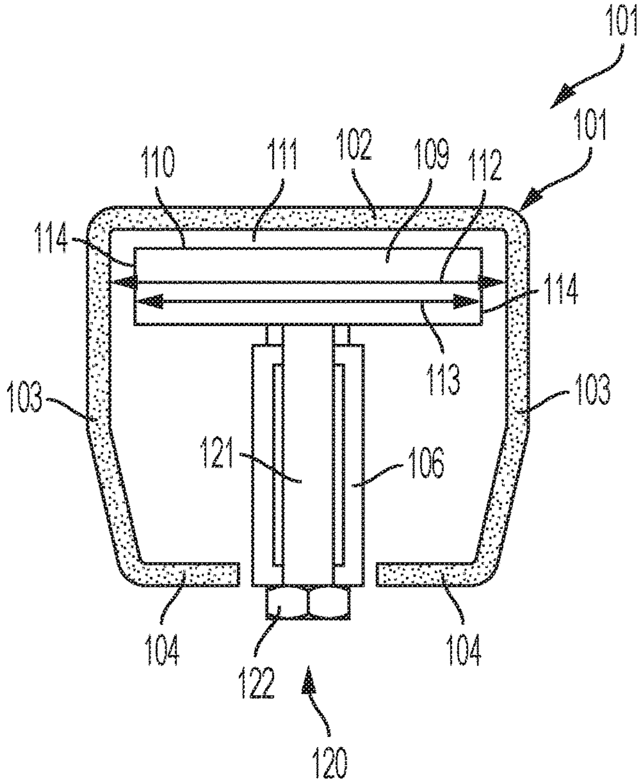
FIG. 9 shows an end cross sectional view illustrating permanent magnets of the carriage.

The chassis 106 further holds permanent magnets 109 along a top of the chassis 106 which are magnetically attracted to the top portion 102 of the channel 101 as best shown in FIG. 9. The permanent magnets 109 define an upper surface 110 held closely adjacent the top portion 102 by the chassis 106 to define a small airgap 111 between the permanent magnets 109 and the top portion 102.

The depth of the airgap 111 may be configured according to the weight of the sliding door so that magnetic force exceeds that of the weight of the door. Typically, the airgap 111 has a depth of less than 5 mm.

As is further evident from FIG. 9, the width of the permanent magnets 109 is maximised within the confines of the channel 101. More specifically, the channel 101 defines an interior width 112 between the side portions 103 and the permanent magnets 109 define a width 113 between lateral sides 114 thereof. The width 113 of the permanent magnets 109 is at least 80% of the interior width 112 of the channel 101.

Furthermore, the permanent magnets 109 may be axially offset along the length of the chassis 106 with respect to the pairs of vertical rollers 107 so that the sides 114 of the permanent magnets 109 laterally overlap the vertical rollers 107. With reference to FIGS. 6 and 9, it is apparent that the sides 114 of the permanent magnets 109 may extend beyond not only inner sides 115 of the vertical rollers 107 but also outer sides 116 thereof. This laterally overlapping configuration of permanent magnets 109 and vertical rollers this 107 allows the system 100 to have a configuration which is laterally compact but which is yet able to achieve significant magnetic force to overcome the weight of the sliding door.

Figure 8:
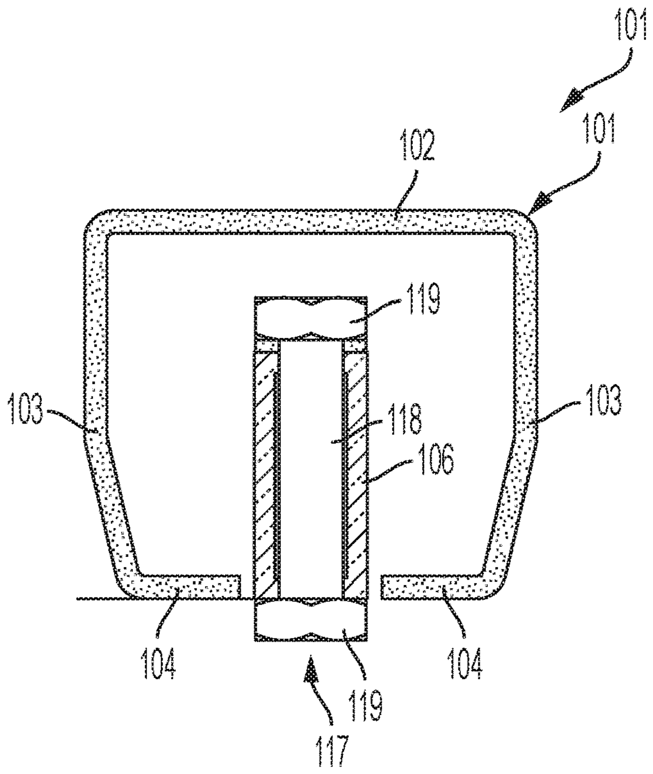
FIG. 8 shows an end cross-sectional view illustrating a hangar of the system.

The chassis 106 suspends door hangers 117, shown in FIG. 8 between the bottom rails 104 to which the sliding door (not shown) is attached. The hangers 117 may attach to a screw bracket or the like fastened to an upper edge of the sliding door.

As is shown in FIG. 8, the hangar 117 may comprise a bolt 118 extending vertically through the chassis 106 and which is secured at ends thereof using a hex head or nut 119.

The system 100 is preferably configured so that magnetic force attraction of the permanent magnets 109 to the top portion 102 exceeds the weight of the sliding door and the carriage 105.

In this way, the system 100 overcomes the weight of the door so that the rollers 107 predominantly run across the top portion 102 of the channel 101, thereby significantly reducing weight borne by the vertical rollers 107 which therefore also significantly reduces opening and closing resistive force.

Given that opening and closing resistive force would also increase with increased vertical force applied against the rollers 107 by the top portion 102, preferably the system 100 is configured so that the vertical force acting between the vertical rollers 107 and the top portion 102 is not excessive. Specifically, the system 100 may be designed so that the magnetic attraction of the permanent magnets to the top portion 102 exceeds the weight of the door and the carriage 105 by between 100% and 120%. In a preferred embodiment, the system 100 is configured to keep the magnetic force attraction within the range of 100% and 110%.

The magnetic force attraction of the system 100 may be configured by adjusting the number of permanent magnets 109, the sizing of the permanent magnets 109 and the depth of the airgap 110.

In one example, where the interior width 112 of the channel 101 is 63 mm and the permanent magnets 109 are disc shaped a 100 kg door could be suspended by one carriage 105 having 3 permanent magnets 109 and an airgap 111 of 3 mm, thereby inducing an attractive magnetic force of 120 kg wherein each vertical roller 107 bears a vertical force of 5 kg against the top portion 102.

In another example, a 150 kg door could be suspended from a pair of carriages 105, each having eight permanent magnets and a 4 mm airgap 111, thereby inducing an attractive magnetic force of 160 kg wherein each vertical roller 107 therefore bears a vertical force of 7.5 kg against the top portion 102.

In a further example, a 200 kg door could be suspended from a pair of carriages 105, each having eight permanent magnets and 3 mm airgap 111, thereby inducing an attractive magnetic force of 240 kg wherein each vertical roller 107 therefore bears a vertical force of 5 kg against the top portion 102.

In embodiments, the system 100 may comprise a vertical offset adjustment mechanism which is configurable to adjust the vertical offset of the permanent magnets 109 with respect to the channel 101 to control the depth of the airgap 111.

Preferably, the vertical offset adjustment mechanism is accessibly adjustable from an exterior of the channel 101 so that the magnetic force can be finely adjusted whilst the sliding door is suspended from the carriage 105.

With reference to FIG. 9, the vertical offset adjustment mechanism 120 may comprise a threaded shaft 121 vertically engaged by the chassis 106 which attaches to a respective permanent magnet 109 at an upper end thereof. A lower end of the shaft 121 may extend from the channel 101 and expose an adjusting nut 122 which may be turned to thereby adjust the vertical offset of the imminent magnet 109 with respect to the channel.

As such, when the door is suspended from the carriage 105, the adjusting nut 122 may be turned to finely adjust the airgap 111 to be able to control the relative magnetic attractive force to the weight of the door, especially to within the aforedescribed ratio of 100% and 110%.

With reference to FIG. 3, the header channel 101 may comprise an upper portion 123 defined between parallel upper vertical wall portions 124 and narrow to a lower portion 125 defined between inwardly angled lower wall portions 126. As is shown in FIG. 3, the horizontal rollers 108 are preferably located within the upper portion.

Furthermore, as is evident from FIG. 6, interior corners 127 defined between the inwardly angled lower wall portions 126 and the bottom rails 104 laterally constrain outer edges of the respective vertical rollers 107 to thereby guide the vertical rollers 107 along the channel 101.

As is evident from FIG. 9, the top portion 102 may be planar and wherein the permanent magnets 109 may define a conforming planar upper surface 110 so that the airgap 111 is substantially uniform therebetween. As is shown in FIG. 1, the magnets 109 may be circular in horizontal cross section.

In embodiments, the carriage 105 may comprise pairs of horizontal rollers 108 only at each end of the chassis 106. With reference to FIG. 1, the carriage 105 may comprise attachment plates 128 attachable to upper surfaces of ends of the chassis 105 in which engage respective pairs of horizontal rollers 108. This arrangement allows the chassis 106 to be relatively narrow whilst the attachment plates 128 spread the horizontal rollers 108 against edges of the side portions 103.

With reference to FIG. 6, the chassis 106 may define a plurality of magnet attachment points 129 there along to which a variable number of permanent magnets 109 may be installed.

In one particular embodiment, the channel 101 may have an exterior height of 60 mm and an interior height of 53 mm. The vertical rollers 107 may comprise a diameter of 52 mm. The channel may have a maximum exterior width of 70 mm and a maximum interior width of 63 mm. The lower inwardly angled wall portions 126 may narrow towards an interior width of approximately 54 mm.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A system comprising:
- a ferromagnetic header channel comprising a top portion, side portions and bottom rails;
- a suspension carriage running within the channel, the carriage having:
  - a chassis;
  - pairs of vertical rollers held axially adjacent along the chassis and engaged oppositely between the top portion and the bottom rails,
  - pairs of horizontal rollers held axially adjacent along the chassis and engaged between the side portions of the channel,
  - permanent magnets held along the top of the chassis which are magnetically attracted to the top portion of the header channel, wherein
    - the permanent magnets define an upper surface held adjacent the top portion by the carriage to define an air gap between the permanent magnets and the top portion;
    - the channel defines an interior width between the side portions and wherein the permanent magnets have a width at least 80% of the interior width of the channel;
    - the permanent magnets and the pairs of vertical rollers are axially offset along the chassis and wherein sides of the magnets overlap the vertical rollers laterally; and
  - a door hanger suspended by the chassis between the bottom rails;
- a sliding door suspended from the door hanger beneath the header channel, wherein:
  - magnetic force of attraction of the permanent magnets to the top portion exceeds the weight of the door and the carriage; and
  - the horizontal rollers bear against magnetic force attraction between sides of the permanent magnets and the side portions of the channel.

2. The system as claimed in claim 1, wherein the magnetic force of the permanent magnets exceeds the weight of the door and the carriage by between 100% and 120%.

3. The system as claimed in claim 1, wherein the magnetic force of the permanent magnets exceeds the weight of the door and the carriage by between 100% and 110%.

4. The system as claimed in claim 1, wherein the air gap has a depth of less than 5 mm.

5. The system as claimed in claim 1, further comprising a vertical offset adjustment mechanism configurable to adjust the vertical offset of the magnets with respect to the header channel to control the depth of the air gap.

6. The system as claimed in claim 5, wherein the vertical offset adjustment mechanism is accessibly adjustable from an exterior of the header channel.

7. The system as claimed in claim 6, wherein the vertical offset adjustment mechanism comprises an externally accessible adjusting nut which turns a screw mechanism inside the header channel to vertically adjust the vertical offset of at least one respective permanent magnet with respect to the channel.

8. The system as claimed in claim 1, wherein the vertical rollers are engaged oppositely between the top portion and the bottom rails to a tolerance of less than 3 mm.

9. The system as claimed in claim 1, wherein the horizontal rollers are engaged between the side portions of the channel to a tolerance of less than 3 mm.

10. The system as claimed in claim 1, wherein the header channel comprises an upper portion defined between parallel upper vertical wall portions which narrows to a lower portion defined between inwardly angled lower wall portions.

11. The system as claimed in claim 10, wherein the horizontal rollers are located within the upper portion.

12. The system as claimed in claim 10, wherein interior corners defined between bottom edges of the inwardly angled lower wall portions and the bottom rails laterally constrain the vertical rollers.

13. The system as claimed in claim 1, wherein the top portion is planar and wherein the magnets define a conforming planar upper surface so that the air gap is substantially uniformly deep.

14. The system as claimed in claim 1, wherein the magnets are each circular in horizontal cross section.

15. The system as claimed in claim 1, wherein the carriage supports a pair of horizontal rollers only at each end of the chassis.

16. The system as claimed in claim 15, further comprising end plates attachable to ends of the chassis and wherein the end plates hold respective pairs of horizontal rollers.

17. The system as claimed in claim 16, wherein the chassis is narrower than the end plates.

18. The system as claimed in claim 1, wherein the chassis comprises a plurality of magnets attachment points therealong to which a variable number of permanent magnets may be attached in use.

19. A method of reducing opening and closing resistance of a sliding door using the system as claimed in claim 1 whereby the system is configured so that the magnetic force of the permanent magnets exceeds the weight of the door and the carriage by between 100% and 120%.

20. The method as claimed in claim 19, wherein the system further comprises a vertical offset adjustment mechanism configurable to adjust vertical offset of the magnets with respect to the header channel to control the depth of the air gap, wherein the vertical offset adjustment mechanism comprises an externally accessible adjusting nut which turns a screw mechanism inside the header channel to vertically adjust the vertical offset and wherein the method further comprising turning the adjusting nut to control the airgap so that the magnetic force of the permanent magnets exceeds the weight of the door and the carriage by between 100% and 120%.

* * * * *